(12) United States Patent
Nyman et al.

(10) Patent No.: US 7,083,050 B2
(45) Date of Patent: Aug. 1, 2006

(54) METHOD AND APPARATUS FOR CLARIFYING A SLURRY

(76) Inventors: Bror Nyman, FIN-28450, Vanha-Ulvila (FI); Matti Nuorala, FIN-95450, Tornio (FI)

( * ) Notice: Subject to any disclaimer, the term of this patent is extended or adjusted under 35 U.S.C. 154(b) by 10 days.

(21) Appl. No.: 10/481,299

(22) PCT Filed: Jun. 19, 2002

(86) PCT No.: PCT/FI02/00537

§ 371 (c)(1),
(2), (4) Date: Dec. 19, 2003

(87) PCT Pub. No.: WO03/000379

PCT Pub. Date: Jan. 3, 2003

(65) Prior Publication Data

US 2004/0168987 A1 Sep. 2, 2004

(30) Foreign Application Priority Data

Jun. 25, 2001 (FI) .................................. 20011352

(51) Int. Cl.
*B01D 21/06* (2006.01)

(52) U.S. Cl. .................. 210/519; 210/208; 210/219; 210/528; 366/307; 366/319

(58) Field of Classification Search ................ 210/208, 210/219, 519, 528; 366/307, 319, 320
See application file for complete search history.

(56) References Cited

U.S. PATENT DOCUMENTS

| | | | | |
|---|---|---|---|---|
| 2,678,730 | A | * 5/1954 | Coulter | 210/738 |
| 3,397,788 | A | * 8/1968 | Duff et al. | 210/195.1 |
| 4,054,514 | A | 10/1977 | Oltmann | 210/20 |
| 4,934,828 | A | * 6/1990 | Janssen | 366/307 |
| 5,182,087 | A | 1/1993 | Lilja et al. | 422/228 |
| 5,478,468 | A | 12/1995 | Deno et al. | 210/208 |
| 5,944,995 | A | * 8/1999 | Sethi et al. | 210/519 |
| 6,358,415 | B1 | * 3/2002 | Leung | 210/205 |
| 6,855,262 | B1 | * 2/2005 | Nyman et al. | 210/800 |

FOREIGN PATENT DOCUMENTS

WO 97/35654 10/1997

* cited by examiner

*Primary Examiner*—Peter A. Hruskoci
(74) *Attorney, Agent, or Firm*—Morgan & Finnegan, L.L.P.; Michael A. Willis

(57) ABSTRACT

The invention relates to a method of clarifying and/or thickening a solution containing solids i.e. a slurry, and the apparatus for accomplishing this. Using the method and apparatus of the present invention, the flocculant to be fed into the clarification and thickening equipment is mixed evenly and with a small shear force into the slurry in the feedwell of the apparatus. The feedwell is equipped with a mixing device. The slurry is taken onwards from the feedwell evenly into the clarification tank inside the underflow layer, which enables the separation of a clear overflow solution.

12 Claims, 3 Drawing Sheets

METHOD AND APPARATUS FOR CLARIFYING A SLURRY

Figure 1:
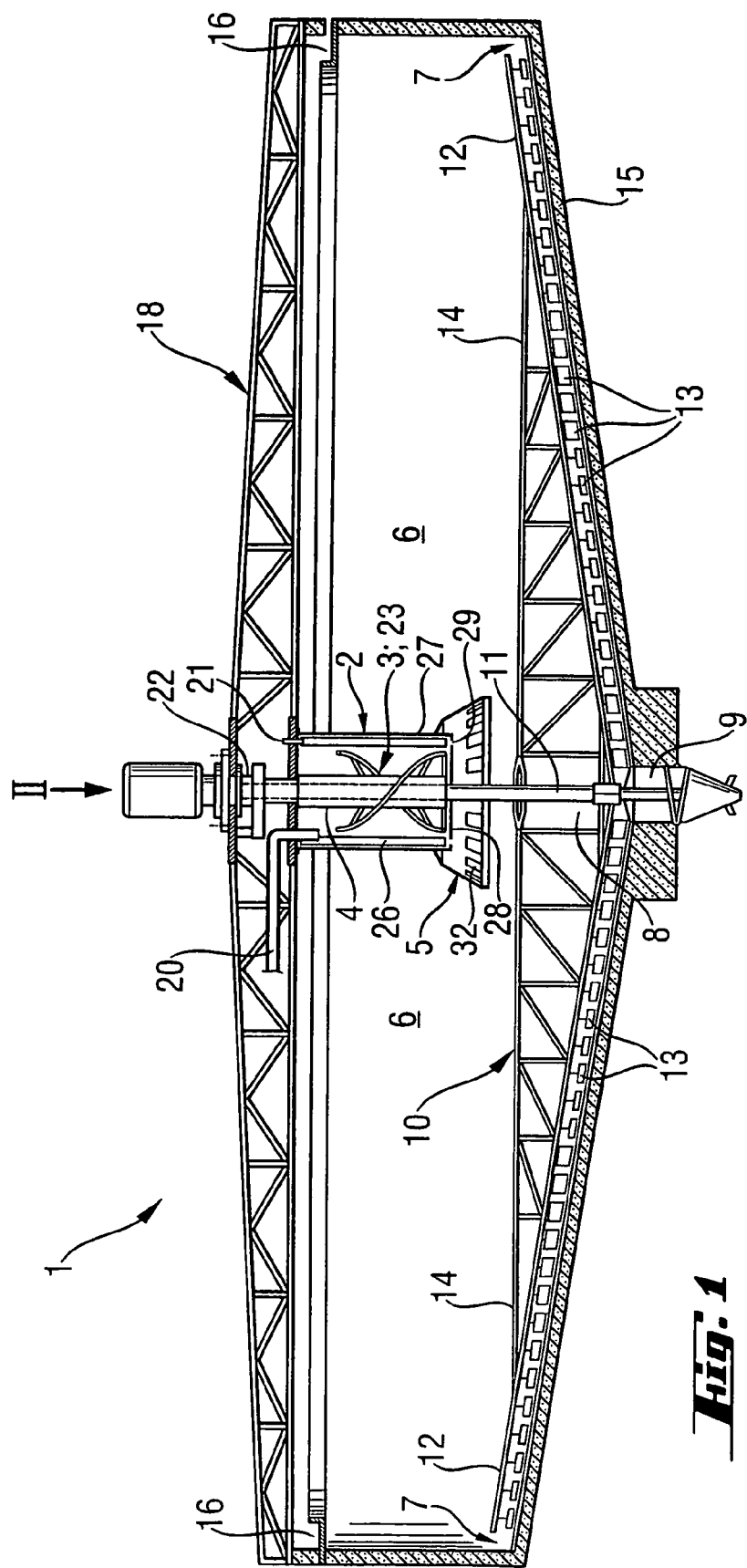

This invention relates to a method of clarifying and/or thickening a solution containing solids i.e. a slurry, and the apparatus for accomplishing this. Using the method and apparatus of the present invention, the flocculant to be fed into the clarification and thickening equipment is mixed evenly and with a small shear force into the slurry in the feedwell of the apparatus. The feedwell is equipped with a mixing device. The slurry is taken onwards from the feedwell evenly into the clarification tank inside underflow layer, which enables the separation of a clear overflow solution.

The clarifying and thickening apparatus comprises a tank, into which the slurry to be clarified is fed via a feedwell, which is located in the centre of the clarification tank, generally in its upper section. When the term clarification is used later in the specification of the invention, it is used however to refer also to thickening, since the methods and apparatus described can be applied for both purposes. The diameter of the clarification tank is ten times larger than that of the feedwell. In addition to the slurry a flocculant used in clarification is fed into the feedwell. The flocculant is often mixed into the slurry while it is being fed into the feedwell. The clarification or thickening tank may be equipped with a rake operating near the bottom, or function without one.

The clarified liquid, or overflow, is removed from the clarification tank as an overflow and the thickened slurry, or underflow, is removed from the central part of the bottom, to where it has been moved by the rake arms. The tank bottom of a thickening tank is usually inclined, i.e. sloping down towards the centre, whereby the removal of solids is made easier. The number of arms in the rake can be varied depending on the design solution. Some of the rake arms may be the length of the tank radius, others may be shorter. Vertical plates are fixed to the rake arms, and they move the slurry from the edges towards the centre. They are fixed either perpendicularly to the rake arm or for example at an angle of 30 degrees to it.

In the prior art the feeding of slurry into a feedwell can be performed in various ways. In the publication: Probst, A.: "Next generation sedimentation equipment for ultimate thickening", Proceedings of Copper 99 International Environment Conference, Vol. II, Oct. 10–13, 1999, Phoenix, Ariz., USA, pp. 217–232, a feed method is described where the feed occurs tangentially. A flocculant is injected into the feedwell either in a tangential, double-elevation slurry feed or it is mixed into the slurry before the feedwell. The slurry is removed from the lower section of the feedwell using the venturi effect. In the apparatus described in U.S. Pat. No. 5,269,928 the slurry is fed into the feedwell via the central section of the bottom of the thickening tank and removed to the thickening tank via apertures located in the wall of the feedwell.

When the mixing of the flocculant into the slurry occurs in the feedwell with only for instance the mixing achieved by a tangential feed, it is clear that the flocculant does not mix evenly and that the local shear forces become large. However, the flocculants used in the present day are large-molecule polymers whose action is hindered as shear forces increase. If the slurry to be transferred to the clarification tank from the feedwell is discharged there forcefully, there is a danger that it will be aimed basically upwards in the direction of the smallest pressure and thus be mixed into the separated, already clarified overflow in the upper section of the tank. The clarification or thickening tank rakes usually function so that they have an "overlarge" displacement capacity, whereby they press the thickened slurry to the centre of the tank, where a pile rises that is higher than the rest of the slurry.

A method and apparatus has now been developed to clarify and/or thicken a solution containing solids, whereby the slurry is first fed into a feedwell situated in the centre of the upper section of the settling space for clarification, where a flocculant is mixed into the slurry in the said feedwell. From the feedwell the slurry is fed to the settling space and the settled solids or underflow is removed via a discharge port in the centre of the settling space and the clarified solution removed as an overflow. The flocculant and slurry are fed into the feedwell as a gentle stream and are mixed into each other using the feedwell's own mixing element, after which the mixed slurry is guided from the feedwell to the settling space in the upper part of the underflow layer as a downward directed flow. The apparatus is comprised of a clarification and/or settling tank, which is equipped with a feedwell for the slurry to be settled, a discharge port for the settled solids or underflow in the centre of the settling tank, a discharge launder for the clarified solution or overflow, and a rake system rotating on its shaft for moving the underflow from the edges towards the centre. The feedwell is equipped with a mixing element rotating on its shaft and a guiding cone for the slurry fixed to the lower section of the feedwell. The essential features of the invention will be made apparent in the attached claims.

The slurry to be fed into the clarification-thickening tank feedwell is flocculated using small shear forces in mixing and thus prevents the disturbance of the flocculant action is prevented. The slurry is fed into the actual thickening tank so that the slurry spreads outwards and downwards from the feedwell. The lower section of the feedwell is formed by a downwardly widening open cone, with apertures placed in the vicinity of the lower edge, through which the flocculated slurry is discharged and spreads into the slurry in the thickening tank without mixing the separated overflow. The thickening tank acting as a settling space is equipped with a rake in the direction of the bottom.

The method of the present invention is especially applicable to cases where the aim is a clear overflow solution, completely separated from solids. The settled and removed underflow can be recirculated back to earlier process steps. Only the equivalent amount of accumulated underflow is taken away for instance via filtration. In this way the hydrodynamic behaviour of the settling space is increased. The method and apparatus have proven beneficial particularly in the treatment of sediment containing gypsum and metal hydroxide. The sediment is formed when the acidic and rinsing waters generated in steel pickling are neutralized with lime compounds.

According to the invention there is a feedwell inside the clarification or thickening apparatus, into which the solids-containing solution or slurry is fed. The slurry can be fed into the feedwell for instance from above, but nevertheless so that the slurry feed is gentle. The flocculant used is also fed into the feedwell. The feedwell is preferably an upright cylinder equipped with its own mixing element. The mixing element is preferably a helix-type mixer working on the principle described in U.S. Pat. No. 5,182,087, with a structure of two tubes circling around a shaft, making ⅓–2 revolutions around the shaft. The mixing direction is rising. Thanks to the mixing element it is possible to mix the flocculant into the slurry evenly and the mixing is of very low and uniform intensity throughout the feedwell zone. Thus strong localized mixing can be avoided.

The diameter of the mixing element is 40–80% of that of the feedwell. The mixing element shaft is a hollow cylinder, with a diameter so large that the shaft of the clarification tank rake and even the coupling flange of the shaft fit through the mixing element shaft. The supports required by the helix tube are fixed at one end naturally to the tubes and at the other to the shaft casing of the mixing element. The feedwell can also be equipped with baffles, which are placed at equal intervals along the edge of the well. Some of the baffles are the height of the feedwell but preferably interspersed with baffles extending from the bottom upwards to a height of only about ⅓ of the long baffles and the total height of the feedwell.

The slurry and the flocculant mixed into it are guided from the actual feedwell downward via openings situated at the lower edge of the feedwell, and always located between the baffles. The openings are in front of the baffles in relation to the rotation direction of the mixer. Thus the pressure pulses caused by the mixer at the point of baffles promote the even discharge of the slurry at each opening. The velocity of the outflow is preferably of the order of 0.05–0.2 m/s. Some of the slurry may also flow through the rake shaft socket.

From the feedwell the slurry flows to a guiding cone located below the feedwell, which extends into the upper part of the slurry layer in the clarification tank. The purpose of the guiding cone is to give a component of downward movement to the slurry entering the settling space, reducing the tendency of the slurry to curve upwards. In this way the slurry spreads evenly into the compacted sediment without mixing the overflow solution. The guiding cone, as its name suggests, is a downwardly widening cone, which is open on its inner side. The slurry from the feedwell is discharged through the openings in the lower part of the edges of the guiding cone into the clarification tank. The intact lower edge of the guide pushes down the compacted slurry, and the pressure differences in the tank cause the slurry to divide itself evenly among the various discharge ports. The guiding cone is situated in the clarification tank in the upper part of the slurry layer, which is still in the compaction stage. It has been shown that the preferable height of the lower section of the guiding cone is 0.5–0.7 times the depth of the solution and slurry in the centre of the tank.

In the settling space, in other words the clarification tank, the underflow, which has settled downwards and compacted at the same time, is moved from the edges of the tank towards the centre using a rake system. If the tank is not cylindrical, the moving of the underflow that has settled in the corners of the tank to a circular boundary must be performed in a way known before. In the apparatus now developed the rake has two arms reaching the edges of the cylindrical tank and between them two arms that are only half the length of the long arms. It is of course clear that the number of long arms and auxiliary arms can be varied within the framework of the invention without being limited to two long and two auxiliary arms. It is characteristic of the clarification tank solution that the underflow displacement capacity is the same from the edges of the tank to its centre. The displacement capacity is measured as being the same as the underflow discharge capacity from the centre of the tank. The method enables the avoidance of overlarge displacement capacity, which result in a growing amount of compacted slurry in the centre of the clarifier, which rises up in piles. The surface of the compacted underflow is not allowed to rise as far as the feedwell guiding cone, and thus an uneven and channelised feed of slurry is avoided.

A uniform displacement capacity in the settling space is achieved so that the height of the underflow displacement plates attached to the rake arms varies. The displacement plates that are at the same distance from the rake shaft move the underflow from the ring-like area inwards. Since the cross-section of the ring-like area gets smaller from the perimeter of the tank as it goes inwards, in order to obtain the same displacement capacity the height of the displacement plates should be increased as the location of the plate gets closer to the rake shaft. Each displacement plate at the same distance from the shaft is at the same height. Thus the height of the outer displacement plates is lower than that of those nearer the centre. In the inner section of the settling space, where the shorter auxiliary arms are located between the long rake arms, the displacement capacity increases as the number of rake arms doubles, and in this way therefore the height of all the displacement plates can be left at the same order of magnitude as the height of the displacement plates at the tip of the rake arms. From here the height of the displacement plates can again be gradually raised towards the centre. The height of the final displacement plates, those closest to the rake shaft, can be kept basically the same, which causes the underflow displacement capacity of the rake arms in the central zone to drop. The height of the displacement plates is kept the same for the distance that corresponds to 15–30% of the length of the tank-length rake arms. When operating in this way, the outer mass of underflow moving towards the centre takes part in moving the underflow in the centre towards the discharge ports. The pressing caused by the outward-moving underflow compacts the underflow even more and raises the solids content of the underflow to be removed.

In the way described above the method of the present invention can prevent the "overcapacity" of underflow displacement. When the power transmission of the rake is equipped with a frequency converter, the underflow displacement capacity can be specified to be more suitable for every situation by adjusting the operating speed of the rake. With the method now developed, the situation can be avoided where the over-displacement of the underflow results in a pile of underflow in the centre of the clarification tank. If a pile is formed, it may cause blocking of the underflow discharge ports and in addition, prevent the even distribution into the settling space of the slurry fed from the feedwell. This in turn results in disturbance of the clarification of the overflow, as mentioned previously.

Figure 2:
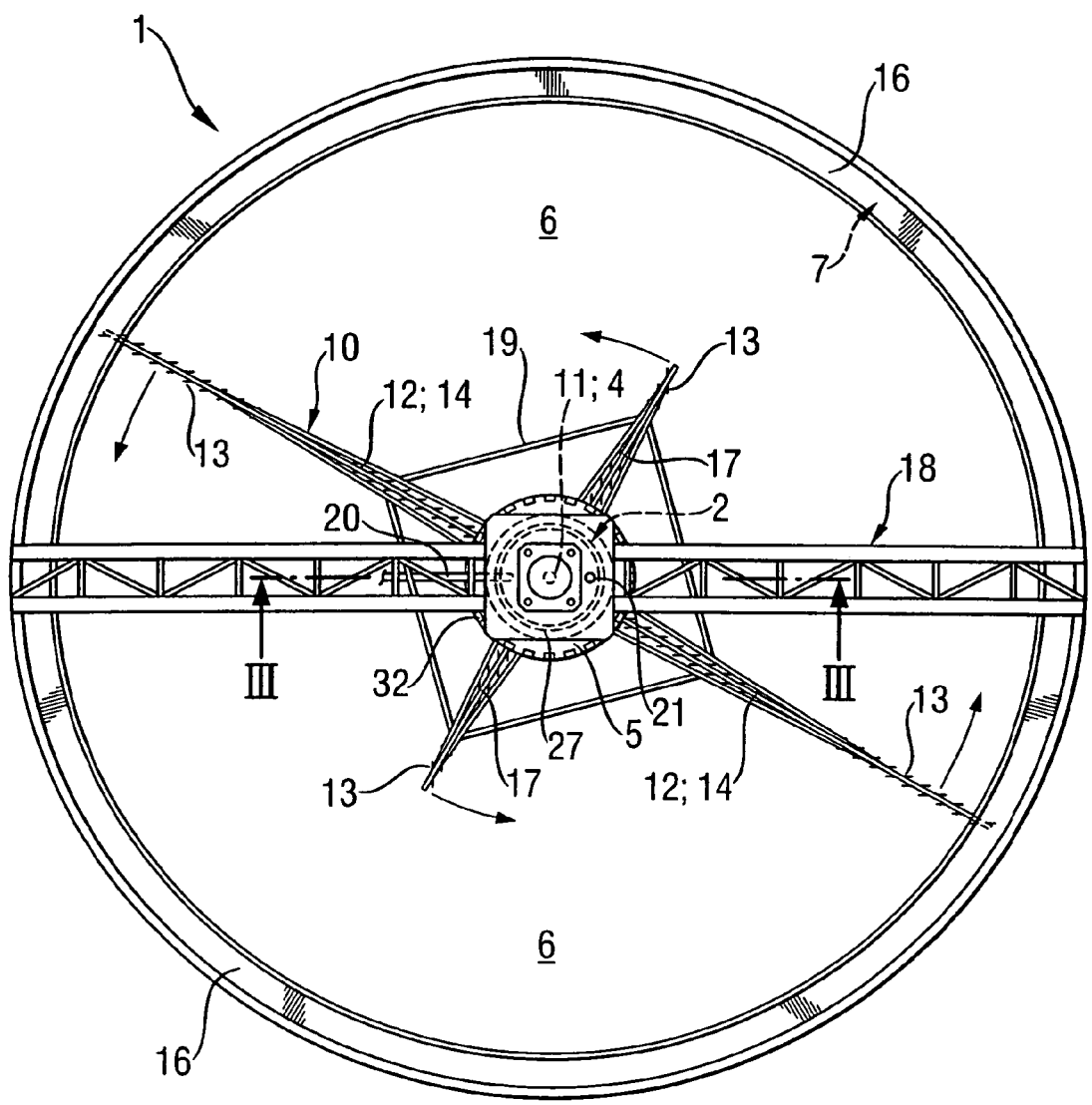
Figure 3:
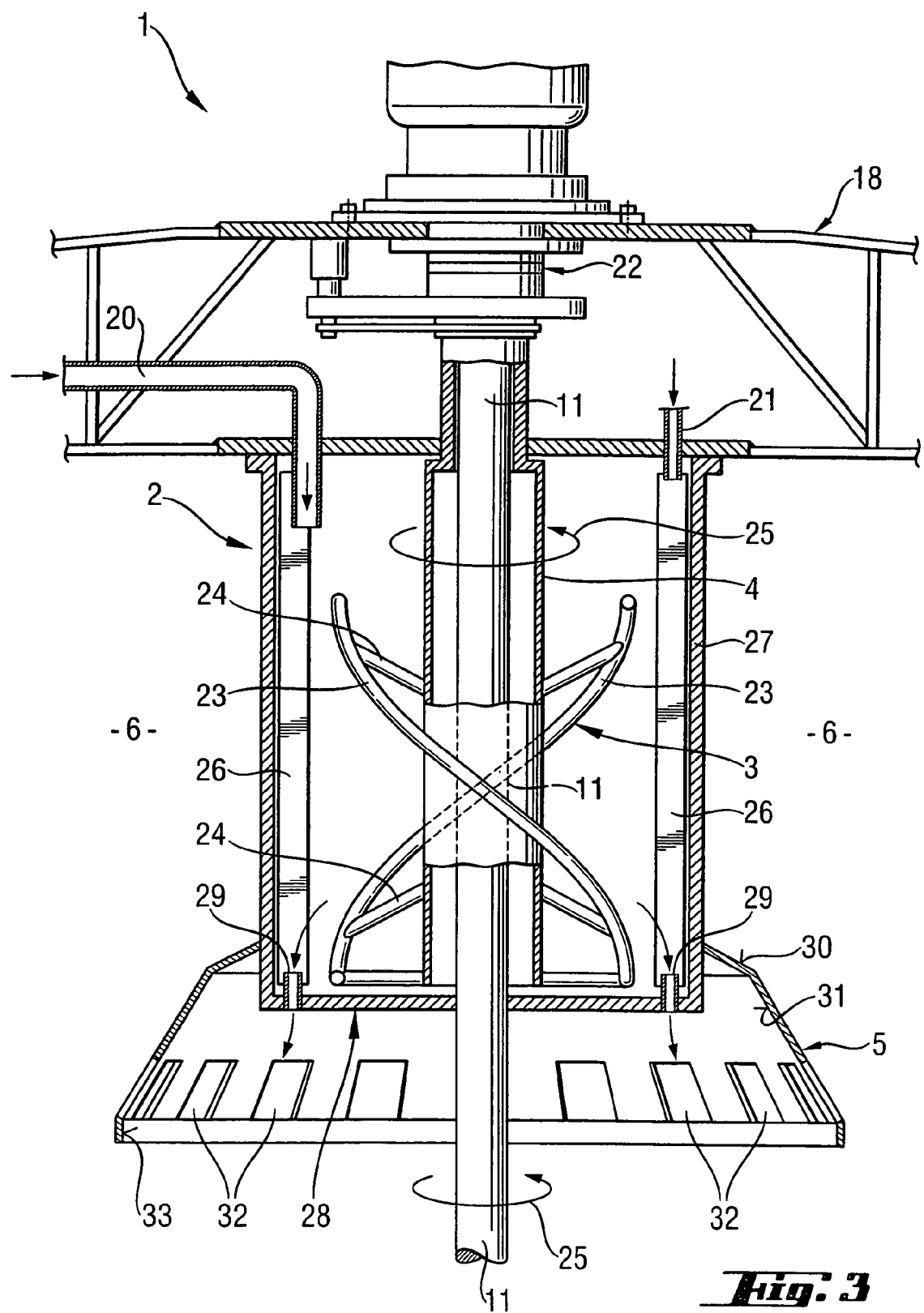

The method and apparatus according to the invention are described further by means of the attached drawings, where FIG. 1 is a vertical section of the whole clarification apparatus, FIG. 2 presents a clarification apparatus according to FIG. 1 as seen from above, and FIG. 3 shows a vertical section of a clarification tank feedwell according to the invention.

FIG. 1 shows a clarification apparatus 1, inside which is a feedwell 2, situated in the centre of its upper section. Inside the feedwell is located a slurry mixing element 3 on its shaft 4. A guiding cone 5 attached to the lower section of the feedwell is seen only partially. Settled underflow is moved into a cylindrical clarification tank 6 from the edges 7 towards an underflow cone 9 situated in the lower section of the central zone 8 of the tank by means of a rake 10. A shaft 11, on which the rake is hung, travels through the mixing element shaft 4. The power transmission of neither shaft is shown in detail. Below rake arms 12 are displacement plates 13, and the diagram also shows that the height of the displacement plates varies depending on their distance from the rake shaft and on the number of rake arms. A rake support structure 14 is above the rake. The central zone 8 is ring-like in shape and extends outwards from the rake shaft a distance of 15–30% the length of the long rake arms 12. The height of the displacement plates in the central zone can be considered constant. The rake arms are parallel with the bottom 15 of the clarification tank, in other words sloping down towards the rake shaft and centre of the tank. The clarification tank thus deepens towards the centre. The clarified overflow is removed from the upper section of the tank into its own discharge launder 16.

FIG. 2 presents the clarification apparatus of FIG. 1 as seen from above. This shows that the rake 10 is equipped in this case with two long rake arms 12 and with two shorter auxiliary arms 17 between them. The drawing shows one rake arm with a supporting beam 18 of the arms drive gear and the others without. The drawing also shows the rake supporting bars 19. The distance of the displacement plates 13 from each other is the same all along the rake arm. As shown in the drawing, the displacement plates are at an angle of about 30 degrees to the rake arm. The length of the displacement plates is the same all along the rake arm. The length of the displacement plates is determined so that the tail end of the previous plate and the front end of the next plate overlap by 10–20%. The functional efficiency of the displacement plates is also improved by the fact that the plates are at a 5–25 degree angle to the vertical plane i.e. they are slightly inclined towards the rake shaft. As the rake rotates the underflow is displaced towards the centre by the ploughing effect of the displacement plates. In addition, as a result of the positioning of the displacement plates described above, the underflow also rises a little over the displacement plates. Thanks to this simple procedure the displacement plates do not compact the thin layer of underflow below the rake, but on the contrary, keep it loose thus preventing the rake from getting wedged stuck.

FIG. 3 presents in more detail the clarification tank feedwell 2, which is upright cylindric in shape. The slurry is fed into the well via a pipe 20, and the flocculant via another pipe 21. Both the slurry and the flocculant can be injected in a gentle stream into the feedwell, because they are mixed together inside the well by means of a mixing element 3. The drawing shows that the mixer shaft 4 is built as a socket so that both the mixing tank rake shaft 11 and also the coupling flange 22 of the rake shaft fit through it. The mixing element 3 is comprised of two tubes 23, which rotate around the shaft at ⅓–2 revolutions. The tubes 23 are supported on the shaft by means of support elements 24. The mixing direction 25 is rising. The diameter of the mixing element is 40–80% of the diameter of the feedwell.

The feedwell 2 is also equipped with baffles 26, which are located evenly on the outer edge 27 of the feedwell. Both the slurry and the flocculant are preferably guided into the feedwell nearby the baffles on the front side of the mixing. Some of the baffles are essentially the same height as the feedwell, but some, preferably every second one, are only ⅓ of the height of the feedwell. All the baffles are supported to rise upwards from the base of the feedwell 28. The baffles number from 12–24. Slurry discharge ports 29 are located in the bottom of the feedwell always between the baffles so that they are in front of the baffles in regard to the rotation direction of the mixing element. According to the feedwell of this invention, the flocculant is mixed into the slurry quickly, but when the residence time of the slurry in the feedwell is regulated between 3–15 minutes, the slurry is flocculated well before it is guided onwards.

Attached to the bottom of the feedwell is a guiding cone 5, which opens downward, and the feedwell discharge ports open into the inside of the guiding cone. The guiding cone is comprised of one or several conical surfaces and is preferably, although not necessarily, open inside. FIG. 3 shows two conical surfaces, of which the upper one 30 opens downwards at a 20–45 degree angle (from the horizontal). The upper conical surface is tightly fixed to the lower conical surface 31, which opens downwards at a 45–75 degree angle (from the horizontal). Located in the lower section of the guiding cone are the slurry guide ports 32. The ports number for example between 16–32 and the outflow of slurry from them can be adjusted within the range of 0.05–0.2 m/s. The lower edge 33 of the guiding cone is whole and preferably vertical. The purpose of the guiding cone is to prevent the slurry being fed into the clarification tank from flowing strongly towards the surface of the underflow layer, which would jeopardise the clarity of the overflow solution. The guiding cone can be dimensioned so that the diameter of its lower edge is 1.3–2 times larger than the diameter of the feedwell. When the guiding cone is formed of several conical surfaces, the steepest conical surface preferably accounts for 55–70% of the total height of the whole guiding cone.

The invention is described further by means of the following examples.

EXAMPLE 1

It was desired to obtain an even displacement of underflow in an industrial scale thickener developed from the perimeter of the cylindrical tank towards the underflow well in the centre. The diameter of the thickener was 27 m and the amount of underflow to be moved to the well was 40 m$^3$/h. An operating speed of 0.075 rpm was chosen for the rake system. The attached Table 1 shows how the height of the displacement plates increases first from the outer perimeter up to the auxiliary rake arms, where the height of the plates decreases, because their number is doubled. After the minimum point at the tip of the auxiliary rake arms, the height of the displacement plates again increases towards the centre. The last displacement plates, those closest to the centre are the same height as each other, so the outward raking pressure compacts the underflow even more.

TABLE 1

| Numbering of displacement plates from edge of tank towards centre | | Height of displacement | Displacement capacity of plates on |
| --- | --- | --- | --- |
| Main rake arms | Auxiliary rake arms | plates mm | same circumference m$^3$/h |
| 1, 2 | | 120 | 43.6 |
| 2, 3 | | 125 | 43.6 |
| 3, 4 | | 130 | 43.8 |
| 4, 5 | | 135 | 43.7 |
| 5, 6 | | 140 | 43.3 |
| 6, 7 | | 148 | 43.8 |
| 7, 8 | | 156 | 44.1 |
| 8, 9 | | 164 | 44.2 |
| 9, 10 | | 172 | 44.0 |
| 10, 11 | | 180 | 43.7 |
| 11, 12 | | 190 | 43.7 |
| 12, 13 | | 200 | 43.2 |
| 13, 14 | | 210 | 42.6 |
| 14, 15 | | 220 | 41.7 |
| 15, 16 | 1, 2 | 130 | 45.8 |
| 16, 17 | 2, 3 | 145 | 47.2 |
| 17, 18 | 3, 4 | 160 | 47.8 |
| 18, 19 | 4, 5 | 175 | 47.6 |
| 19, 20 | 5, 6 | 190 | 46.6 |
| 20, 21 | 6, 7 | 205 | 44.8 |
| 21, 22 | 7, 8 | 220 | 42.2 |
| 22, 23 | 8, 9 | 220 | 36.3 |
| 23, 24 | 9, 10 | 220 | 30.5 |
| 24, 25 | 10, 11 | 220 | 24.5 |
| 25, 26 | 11, 12 | 220 | 18.7 |
| 26, 27 | 12, 13 | 220 | 17.4 |

EXAMPLE 2

A settling test showed that the slurry is distributed evenly in a thickener according to the invention. The slurry used in the tests was an industrial-scale thickener underflow, which had been obtained by neutralising the waters containing iron(III), chrome(III) and nickel(II) and sulphate generated in refined steel pickling. 52% of the solids in the slurry were gypsum and the rest metal hydroxides. The diameter of the test thickener was 1100 mm and the effective depth of the cylinder section 340 mm. The conical bottom inclined at an angle of 9.5° towards the centre. The rake was in principle according to that described in example 1. The diameter of the feedwell of the thickener was 172 mm and the effective depth 315 mm. The baffles and guiding cone were as described in the preamble. The feedwell mixer was a helix-type i.e. including two tubes around the shaft rising one revolution in the mixing direction, and at a constant distance from the shaft. The diameter of the mixer was 110 mm and the depth 252 mm.

The underflow previously settled in the settling test was pumped back into circulation via the thickener feedwell. Water was also fed into the feedwell in the proportion of three parts to one part underflow. Water separated in the thickener was removed as thickener overflow. The feed of underflow and water was increased in proportion and then lowered in the same ratio to determine the separation capacity and separation efficiency of the thickener. At first a flocculant was not used, so that the performance characteristic of the thickener was largely dependent on how evenly the slurry flowed out of the feedwell when it was first mixed. In the test, the speed of revolution of the mixer was 127 rpm and that of the rake 0.4 rpm. In the final stages of the test the clear separated water layer developed as follows:

TABLE 2

| Time min | Water feed l/h | Underflow feed l/h | Water layer Mm |
|---|---|---|---|
| 00 | 142 | 45 | 119 |
| 15 | 144 | 45 | 94 |
| 114 | 131 | 36 | 87 |
| 170 | 131 | 35 | 75 |
| 195 | 101 | 35 | 82 |

According to the results described above, the maximum feed of the test thickener can be determined as about 120 l/h water and 40 l/h underflow. The input flows can be raised surprisingly high, when taking into account the settling properties and the fact that no flocculant was used in the test. The water layer that separated out was completely clear, which also indicates that the mixer used in the feedwell evens out the thickener feed. The conventional thickener, from whence the underflow used in the test came, was not able to achieve the same performance, since the separated overflow remained cloudy.

EXAMPLE 3

The test in example 2 was carried out using the flocculant Fennopol A305, which was dosed as a 0.5 g/l-solution of 136 mg/kg solids. The overflow layer was in the order of 100 mm and completely clear, when the feed was 360 l/h water and 120 l/h underflow. The feedwell mixer was thus able to mix the water, underflow and flocculant homogeneously and distribute it evenly into the slurry layer of the thickener.

The invention claimed is:

1. An apparatus for the clarification and/or thickening of a solution containing solids, where the apparatus comprises a clarification and/or settling tank, which is equipped with a feedwell for a slurry to be settled, a discharge port for the settled solids or underflow in the center of the settling tank, a discharge launder for a clarified solution or overflow, and a rake system rotating on its shaft in order to move the underflow from the edges towards the center of the tank, wherein the feedwell being equipped with a mixing element rotating on its shaft and being a helix mixer, formed of two tubes attached to a shaft by means of support elements, which make ⅓–2 revolutions around the shaft, and a guiding cone for the slurry fixed to the lower section of the feedwell being comprised of at least one conical surface which is open inside and equipped with slurry guide ports, wherein the bottom of the feedwell is equipped with slurry discharge ports.

2. An apparatus according to claim 1, wherein the shaft of the settling tank rake is located to go through a shaft of the feedwell mixing element.

3. An apparatus according to claim 1, wherein the feedwell is equipped with baffles.

4. An apparatus according to claim 3, wherein the height of at least some of the baffles is essentially the same as the height of the feedwell.

5. An apparatus according to claim 3, wherein the height of at least some of the baffles is essentially ⅓ of the height of the feedwell.

6. An apparatus according to claim 3, wherein the slurry discharge ports are located between the baffles.

7. An apparatus according to claim 1, wherein the conical surface of the guiding cone opens downwards at a 45–75 degree angle from the horizontal.

8. An apparatus according to claim 1, wherein the guiding cone attached to the lower part of the feedwell is comprised of two conical surfaces which are open inside.

9. An apparatus according to claim 8, wherein the guiding cone attached to the lower part of the feedwell is comprised of two conical surfaces which are open inside, and of which an upper conical surface opens downwards at an angle of 20–45 degrees from the horizontal and a lower conical surface opens at an angle of 45–75 degrees from the horizontal.

10. An apparatus according to claim 8, wherein the two conical surfaces are an upper conical surface and a lower conical surface, and wherein an essentially vertical lower edge is fixed to the lower conical surface of the guiding cone.

11. An apparatus according to claim 10, wherein the diameter of the essentially vertical lower edge fixed to the lower conical surface of the guiding cone is 1.3–2 times that of the diameter of the feedwell.

12. An apparatus according to claim 8, wherein the lowest conical surface of the conical surfaces according to claim 8 is equipped with slurry guide ports.

* * * * *